United States Patent [19]
Nishio et al.

[11] Patent Number: 5,392,178
[45] Date of Patent: Feb. 21, 1995

[54] MOTOR FOR A DISC DRIVING DEVICE HAVING A HUB POSITIONED ON INNER RACE OF AN UPPER BEARING

[75] Inventors: Akira Nishio; Masaru Kumazawa; Kenji Seki, all of Fujieda; Akihiro Mochizuki, Shizuoka; Takamasa Numakura, Fujieda, all of Japan

[73] Assignee: Victor Company of Japan, Ltd., Yokohama, Japan

[21] Appl. No.: 37,999

[22] Filed: Mar. 25, 1993

[51] Int. Cl.⁶ .................. G11B 17/02; H02K 7/00
[52] U.S. Cl. .................. 360/99.08; 360/99.12; 360/98.07; 360/98.08; 310/67 R; 310/90
[58] Field of Search ............. 360/97.01, 97.02, 97.03, 360/98.01, 98.07, 98.08, 99.08, 99.12; 310/67 R, 90, 90.5

[56] References Cited
U.S. PATENT DOCUMENTS

| | | | |
|---|---|---|---|
| 4,739,425 | 4/1988 | Dierkes et al. | 360/98.08 |
| 4,775,906 | 10/1988 | Suzuki et al. | 360/98.08 |
| 4,868,436 | 9/1989 | Attilio et al. | 310/67 R |
| 4,922,406 | 5/1990 | Schuh | 360/98.07 |
| 5,040,085 | 8/1991 | Elsasser et al. | 360/98.07 |
| 5,153,470 | 10/1992 | Miyaji et al. | 310/67 R |
| 5,200,866 | 4/1993 | Fruge et al. | 360/98.07 |
| 5,274,289 | 12/1993 | Wrobel | 310/90 |
| 5,304,879 | 4/1994 | Suzuki et al. | 310/67 R |

FOREIGN PATENT DOCUMENTS

| | | | |
|---|---|---|---|
| 61-165874 | 7/1986 | Japan | 360/98.07 |
| 62-239466 | 10/1987 | Japan | 360/98.07 |
| 4-4738 | 1/1992 | Japan | |

*Primary Examiner*—Stuart S. Levy
*Assistant Examiner*—Jefferson Evans
*Attorney, Agent, or Firm*—Michael N. Meller

[57] ABSTRACT

A motor for a disc driving device having a single straight shaft for rotating a magnetic disc mounted on a hub press-fitted to the single shaft. The single straight shaft is prevented from being driven out of the hub by providing internal threads at both ends of the straight shaft for engaging first and second screws through the internal threads respectively. The first screw causes a clamper to depress a magnetic hard disc against the hub, the second screw is provided to prevent the single straight shaft from being driven out of the hub. The straight shaft abuts a first and second bearing separated by spacer means disposed under the hub in alignment with the first and second inner races of the first and second bearing.

4 Claims, 3 Drawing Sheets

MOTOR FOR A DISC DRIVING DEVICE HAVING A HUB POSITIONED ON INNER RACE OF AN UPPER BEARING

BACKGROUND OF THE INVENTION

1. Field of the Invention

The present invention relates to an improved magnetic hard disc driving device (HDD) and, more particularly, to a very thin magnetic hard disc driving device.

2. Description of the Related Art

Presently, in accordance with a growing demand for enlarging a storage capacity of a magnetic disc device and in particular, of a magnetic hard disc driving device (HDD), there has arisen a growing demand for improving the flatness of a rotating hard disc for both recording and reproducing operations.

Generally, the magnetic disc is mounted on a hub which is fixed on a shaft of a spindle motor in a press-fitted manner or the like. The spindle motor, as used herein is referred to as an "in-hub type motor", of which the rotor and the stator are built in a concave portion of the hub which supports a disc. This type of motor is widely employed in a very thin hard disc driving device because the in-hub type motor can be hermetically assembled to a compact size.

In order to meet the demand for improving the flatness of the rotating magnetic disc, there are proposed many measures for flatly supporting the hard disc on the hub of the in-hub type motor in the prior arts.

Next, a description is given of an example of a disc driving device of the prior arts.

FIG. 1 is a cross sectional view showing an example of a disc driving device in the prier art.

A disc driving device 100 in the prior art employs an in-hub type motor 101 comprising a hub 102 as a rotor having a cylindrical concave 102a and a magnet 102b disposed on the inner wall of the concave 102a, a stator 103 having a starer core 103a and coils 103b provided on the starer core 103a which is assembled in the cylindrical concave 102a of the hub 102, a shaft 104 fixed to the hub 102 by using an adhesive or a press fit to be rotated together with the hub 102, a pair of bearings 105, 105 provided between the the shaft 104 and the starer 103, a clamber 106 for clamping a magnetic disc 108 or a plurality of discs (not shown) on the hub 102 and a screw 107 having an external thread for pressing the clamper 106 to the hub 102.

The magnetic disc 108 having a center hole 109 is installed in the hub 102 by causing the center hole 109 to be inserted with the hub 102, and is depressed against the hub 102 at a peripheral portion of center hole 109 thereof by means of the clamper 106 and the screw 107 in such a manner that the external thread of the screw 107 engages with an internal thread 104a provided in an upper end of the shaft 104 at a center axis thereof so as to be rotated together with the hub 102, wherein the flatness of the magnetic disc 108 increases in proportion to an increase of the downward pressure applied to the magnetic disc 108 by the screw 107.

However, if the shaft 104 is constructed in a cylindrical column, i.e., a straight shaft, the shaft 104 is apt to be driven out of the hub 102 by overcoming fixing force between the shaft 104 and the hub 102 and between the shaft 104 and the bearings 105, 105 when the screw 107 is tightened, so that it is impossible to fix securely the magnetic disc 108 on the hub 102 by the screw 107.

As a general countermeasure for preventing the shaft 104 from being driven out, the shaft is provided with a step portion 104b which prevents the screw 107 from causing a shearing force between the shaft 104 and bearings 105, 105 because the hub 102 as well as the clamper 106 pinched between the step portion 104b of the shaft 104 and the screw 107 as shown in FIG. 1, however, this poses problems of causing an increase a production cost of the shaft 104, and degrading the strength of the bearings 105, 105 because the shaft 104 has to be provided with the step portion 104b and each of the inner diameter of the bearings 105, 105 increases corresponding with the increase of the diameter of the shaft 104 for providing the step portion 104b thereon. For instance, a basic static load (Co) rating of a bearing having an inner diameter of 3 mm and an outer diameter of 8 mm is 19 kgf, on the other hand, a basic static load rating of a bearing having an inner diameter 4 mm and an outer diameter 8 mm is 13 kgf.

Next, the description is given to another prior art example of the disc driving device.

FIG. 2 is a cross sectional view showing another example of the disc driving device in the prior art.

Referring to FIG. 2, this disc driving device 110 employs an in-hub type motor 111 having a hub 112 integrally constructed with a shaft 112a, which eliminates a possibility of the shaft 112a being driven out of the hub 112.

Other components are constructed as in the foregoing prior art example of in FIG. 1 and in FIG. 2, with identical components to those in the described prior art examples for simplicity depicted by identical reference characters without detailed explanation thereof.

On the other hand, in the in-hub type motor 111, the shaft 112a is generally finished by machining, so that the dimensional accuracy and roundness of the shaft 112a are degraded compared with a shaft finished with a centerless polishing.

Generally, in a spindle motor of a hard disc device, a clearance if present in a bearing part causes an axial runout and radial runout of the shaft on which the hub together with the magnetic disc is mounted, this poses generation of data errors in writing and reading data on and from the magnetic disc. Therefore, the clearances between the shaft 112a and the inner races of the bearings 105, 105, and between the outer races of the bearings 105, 105 and a bearing housing such as a sleeve 113, which sleeve 113 is fixed to a stator frame 114, need to be avoided by using an adhesive and/or a press-fit assembling.

Therefore, in the assembly process of the in-hub type motor 111, the best way to compensate the clearance between the shaft 112a and the inner races of the bearings 105, 105 is to machine the disc mounting surface 112f and the disc fitting surface 112c of the hub 112 after the motor 111 is assembled. However, in practice, the shaft 112a is usually press-fitted to the inner races of the bearings 105, 105 without such an adaptive working, taking account of an increase of the product cost of the hub 112. In the press-fitting process of the shaft 112a having such poor dimensional accuracy, however, the lace surfaces of the inner races (ball rolling surface) of the bearings 105, 105 are deformed, which poses a problem of degrading None Repeatitive Run-Out (NERO) characteristic which is important to the hard disc driving device.

SUMMARY OF THE INVENTION

A general object of the present invention is to provide a novel and useful disc reproducing apparatus in which the above problem has been eliminated.

A specific object of the present invention is to provide a disc driving device having a spindle motor for rotating a magnetic disc mounted on a hub which is fixed on the spindle in a press-fitted manner, of which spindle is so prevented in construction from being driven out of the hub in spite of its straight shape.

A more specific object of the present invention is to provide a disc driving device employing a motor having a hub serving as a rotor in which hub a concave portion is formed and a stator mostly assembled within the concave portion of the hub, for rotating at least a magnetic disc mounted on the hub, wherein the motor comprising, a single straight shaft cylindrically shaped, the straight shaft being provided with internal threads at both end portions thereof, the hub being fixed on the straight shaft in a press-fitted manner, a clamper for clamping the magnetic disc to the hub, a clamping screw for pressing the clamper to the hub through the disc to fix thereon by engaging with one of the internal thread of the straight shaft, and a stopper screw for preventing the straight shaft from being driven out of the hub by engaging the stopper screw with the other internal thread of the straight shaft, wherein the hub together with the magnetic disc is fixed on the straight shaft between the clamp screw and the stopper screw by causing the clamp and stopper screws to engage with respective internal threads of the shaft.

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings wherein.

DETAILED DESCRIPTION OF THE PREFERRED EMBODIMENT

Next, an embodiment of the disc driving device of the present invention is described with reference to a accompanying drawing.

Figure 3:
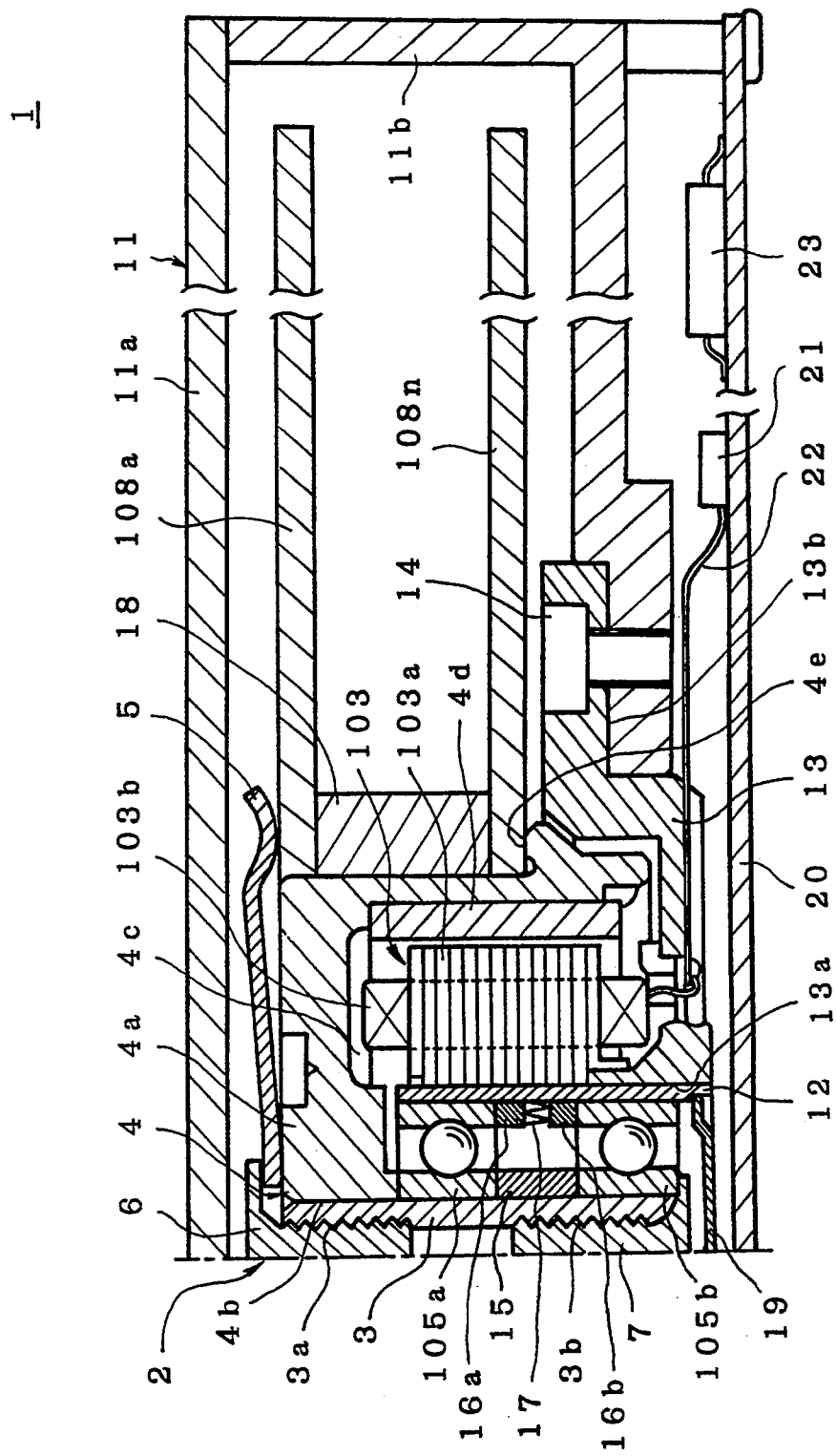
FIG. 3 is a cross sectional view showing a disc driving device of the invention.

FIG. 3 is a cross sectional view showing a disc driving device of the present invention, wherein identical constructive components to those of the described prior art examples are depicted by identical reference characters without detailed explanation thereof for simplicity.

Referring to FIG. 3 an embodiment of a disc driving device 1 of the present invention generally comprises a housing 11 constructed with a top plate 11a and a chassis 11b, and an in-hub type motor 2 hermetically provided in the housing 11 for rotating a pair of magnetic discs 108a, 108 n.

The in-hub type motor 2 o:f the present invention generally comprises a straight shaft 3 having internal threads 3a and 3b at both ends thereof, a stator 103 having a stator core 103a and coils 103 wound therearound, and a rotor 4 having a hub 4a for mounting and rotating the pair of the magnet discs 108, 108 n, which hub 4a is fixed to the straight shaft 3 as mentioned hereafter.

The stator 103 further comprises a sleeve 12 having a cylindrical straight configuration en whose outer surface the stator core 103 is fixed, and a stator frame 13 having a cylindrical inner surface 13a for fixing the sleeve 12 in a press-fitted manner thereon. The stator 103 fixed on the chassis 11b by causing the flat portion 13b thereof to be screwed by the screw 14.

The hub 4a is provided with a center hole 4b which is press-fitted with the straight shaft 3. A magnet 4 d is disposed in the cylindrical concave 4c so as to face the stator core 103 when assembled.

In the assembly of the in-hub type motor 2, the straight shaft 3 is press-fitted along an inner surface of the cylindrical sleeve 12 with a pair of bearings 105a and 105b interposed therebetween. The straight shaft 3 is also press-fitted to the center hole 4b of the hub 4a to form an integral structure. The reference character 15 designates a spacer which is provided between the inner races of the bearings 105a and 105b with additional spacers provided between the outer races of bearings 105a and 105b. A wave washer 17 is interposed between the outer races of bearings 105a and 105b to provide a pre-load to the bearings 105a, 105b.

After the pair of the magnetic discs 108a and 108 n are mounted on the hub 4a with a spacer 18 interposed therebetween, both a clamp screw 6 and a stopper screw 7, each having a head, are respectively engaged with the both internal threads 3a and 3b in such a manner that the head of the clamp screw 6 depresses the upper surface of hub 4a with a clamper 5 being interposed therebetween causing a periphery of the clamper 5 to depress downward an inner peripheral portion of the magnetic disc 108a so that the other magnetic disc 108 n is depressed against a collar 4e of the hub 4a through the spacer 18, on the other hand, the cap of the stopper screw 7 depresses the bottom of the inner race of the bearing 105b to prevent the the straight shaft 3 from being driven out by the pressure of the clamp screw 6.

In this embodiment, materials of the straight shaft 3, bearings 105a and 105b, the hub 4a and the sleeve 12 have substantially the same coefficient of linear thermal expansion so as to avoid a development of different thermal expansions of the materials by the temperature change.

Figure 1:
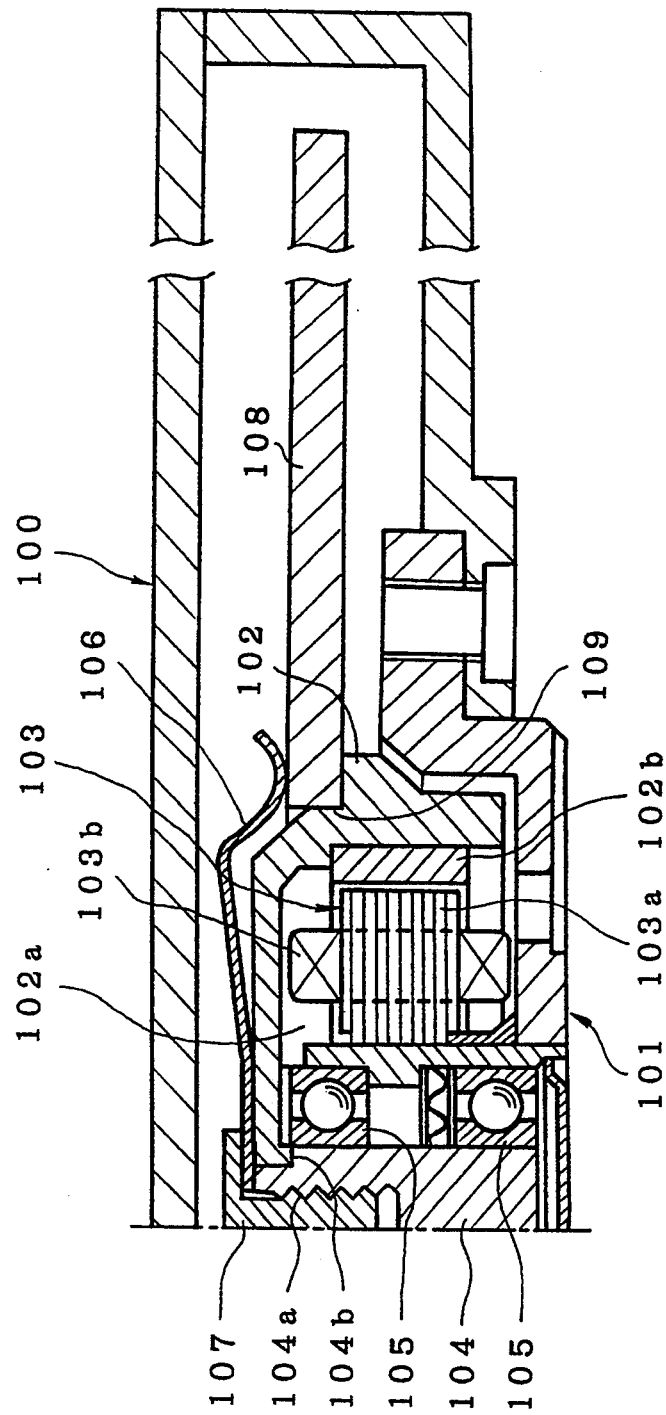
FIG. 1 is a cross sectional view showing an example of a disc driving device in the prior art.
Figure 2:
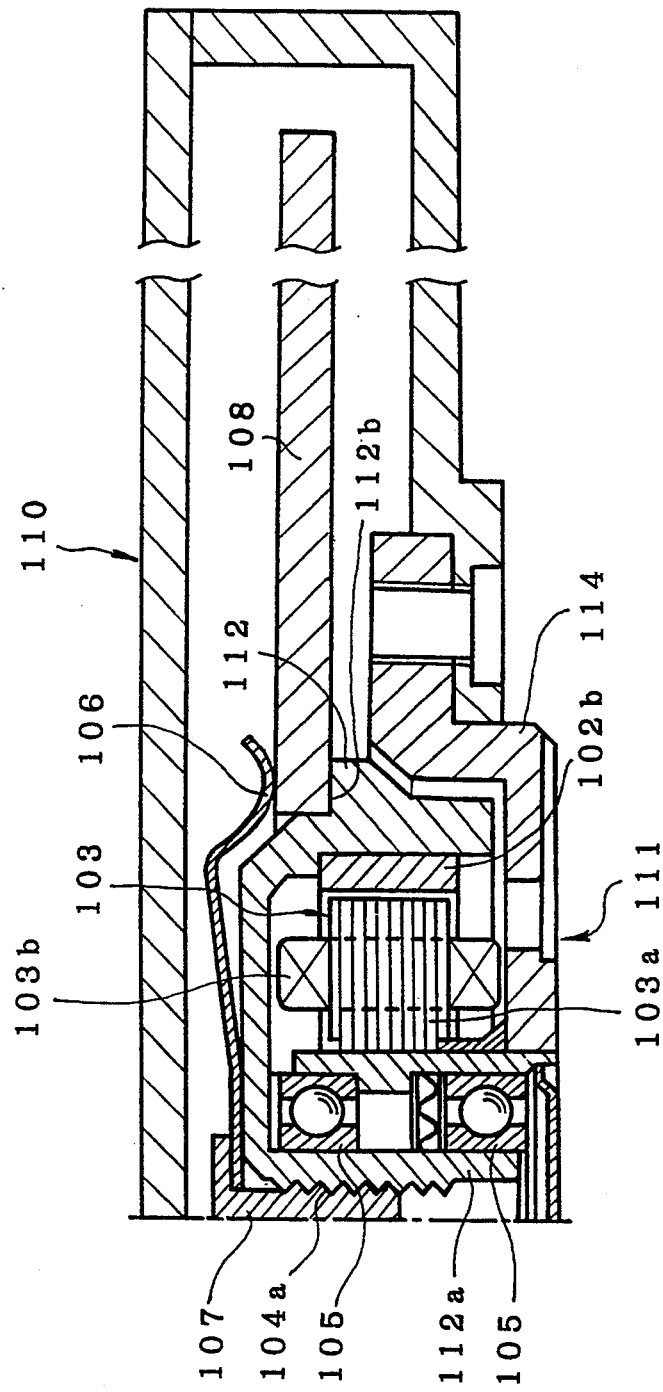
FIG. 2 is a cross sectional view showing another example of the disc driving device in the prior art.

In FIG. 1, a numeral 19 designates a cover for hermetically sealing the bearings; 105a and 105b, 20 a bottom plate, 21 a connector provided on the bottom plate 20, 22 flexible wiring board for connecting the coils 103b to the connector 21, and 23 a circuit assembly.

As mentioned in the foregoing, the straight shaft 3 is prevented from being driven out of the hub 4a and the inner races of bearings 105a, 105b by engaging the clamping and stopper screws 6, 7 with the inner threads 3a, 3b provided at the both ends of the straight shaft 3 in such a manner that the clamping screw 6 depresses the magnetic discs through the clamper 5 to hold flatness of the magnetic discs 108a, 108 n and the stopper screw 7 presses the bottom of the bearing 105b, so that the pressure exerted by the clamp screw 6 never fails to press the magnetic discs 108a, 108 n against the hub 4a.

According to the present invention, primarily, it provides a disc driving device capable of reducing production cost because of employing a straight shaft as the shaft of the in-hub type motor. Secondly, it provides a disc driving device having an excellent shock resistance because of employing bearings having smaller inner diameters, thus, having higher value of static lead, in contrast to the conventional one employing a shaft having a step portion. Third, it provides a disc driving device capable of meeting the demand for a high density recording and an enlarged storage capacity of a magnetic disc device because of decreased run out of the hub, on which magnetic discs are mounted, and of improving NRRO characteristic by preventing lace surfaces of bearings from being deformed by employing a straight shaft which al lows the use of centerless polishing to obtain a precise dimension thereof without employing the adaptive working as mentioned in the prior art.

What is claimed is:

1. A motor for a disc driving device having a hub serving as a rotor for rotating at least a magnetic disc mounted on the hub; said hub having a concave portion in which a stator of said motor is assembled, said motor comprising:

a single straight shaft being provided with internal threads at least at both end portions thereof, said single straight shaft being press-fitted to said hub;

a first bearing means having a first inner race and a first outer race, said first inner race being press-fitted to the single straight shaft, said hub being placed on said first inner race of the first bearing means;

a second bearing means having a second inner race and a second outer race, said second inner race being press-fitted to the single straight shaft under said first bearing means;

spacer means interposed between said first and second inner races of the first and second bearing means;

means for clamping the magnetic disc on the hub;

first screw means engaging with one of said internal threads for causing said clamping means to depress the disc against said hub; and second screw means engaging with the other of the internal threads for preventing the single straight shaft from being driven out of the hub, wherein said hub holding the magnetic disc is secured on the single straight shaft by being interposed and tightened between the first screw means and second screw means in such a manner that said clamping means is disposed under said first screw means, and said first and second inner races of the first and second bearing means with said spacer means being interposed under said hub in alignment with said first and second bearing means.

2. A motor for a disc driving device as claimed in claim 1, wherein the stator of the motor further comprises a straight sleeve of cylindrical shape and a stator frame to which the straight sleeve is fixed.

3. A motor for a disc driving device as claimed in claim 2, wherein said first and second our races of the first and second bearing means are press-fitted to the straight sleeve being interposed between the straight sleeve and the single straight shaft.

4. A motor for a disc driving device as claimed in claim 3, wherein pressure exerted by the second screw means is applied to a bottom of said second inner race of the second bearing means.

* * * * *